United States Patent [19]

Lorenz

[11] 4,012,073
[45] Mar. 15, 1977

[54] THREE-POINT SAFETY BELT, MORE PARTICULARLY FOR CHILDREN

[75] Inventor: Hans-Jochim Lorenz, Hamburg, Germany

[73] Assignee: Stakupress Gesellschaft fur Stahlund Kunststoffverarbeitung mbH & Co. KG, Norderstedt, Germany

[22] Filed: Feb. 25, 1976

[21] Appl. No.: 661,310

[30] Foreign Application Priority Data

Mar. 6, 1975  Germany .................. 2509758

[52] U.S. Cl. .............................................. 297/389
[51] Int. Cl.² .......................................... A62B 35/00
[58] Field of Search .................. 297/385, 388, 389; 280/744

[56] References Cited
UNITED STATES PATENTS

| | | | |
|---|---|---|---|
| 944,020 | 12/1909 | De Camp | 297/385 |
| 2,817,393 | 12/1957 | Mitchell | 297/385 |
| 3,529,864 | 9/1970 | Rose et al. | 297/385 X |
| 3,885,812 | 5/1975 | De Lavenne | 297/388 |

Primary Examiner—James T. McCall
Attorney, Agent, or Firm—Prutzman, Hayes, Kalb & Chilton

[57] ABSTRACT

A motor vehicle passenger safety belt with a pelvic belt with two end parts connected to the motor vehicle for extension from opposite sides of a passenger, a shoulder belt connected to the motor vehicle and to the pelvic belt and so as to cross in front of the passenger downwardly over one shoulder toward the other side of the passenger, and a back belt connected between the shoulder belt in front of the passenger and to the end part of the pelvic belt extending from said other side of the passenger.

6 Claims, 4 Drawing Figures

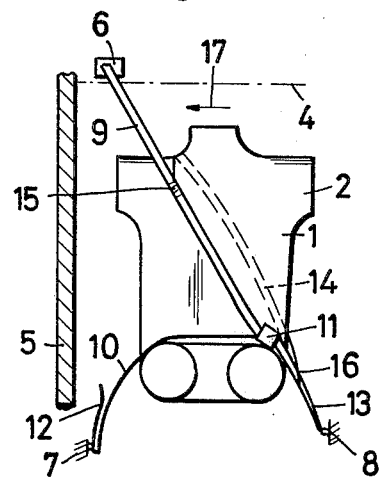
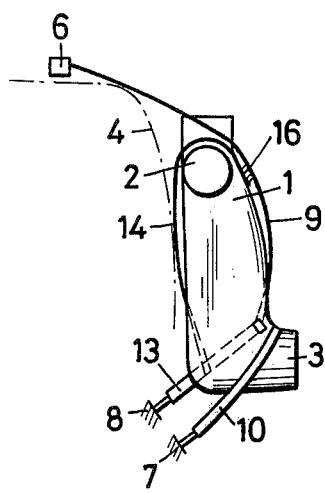
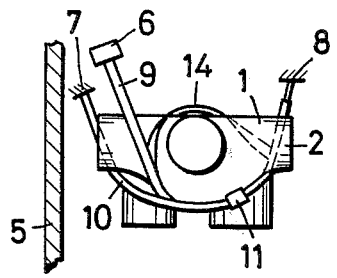
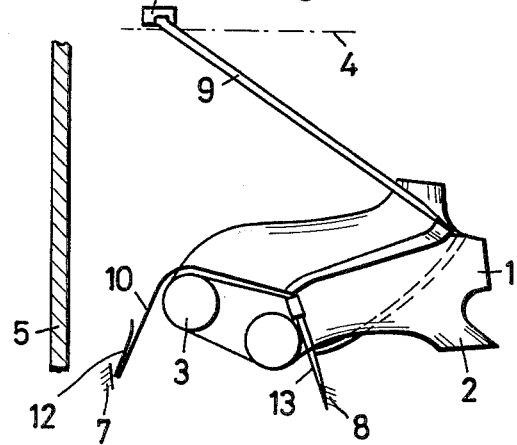

THREE-POINT SAFETY BELT, MORE PARTICULARLY FOR CHILDREN

BACKGROUND OF THE INVENTION

1. Field of the Invention

The present invention relates to a three-point motor vehicle safety belt, more particularly, a child's safety belt, comprising a belt section which forms the shoulder belt and which passes through the lock fastening to form a part of the pelvic belt, and further comprising an additional belt section which forms the other part of the pelvic belt.

2. Description of the Prior Art

There are certain problems involved with the use of three-point safety belts for children because the shoulder belt is not retained by the child's roundish body shape and the child's frequent movements cause the belt to slip off. Furthermore, a child cannot be expected to check whether his safety belt is in the correct position. Thus, if a pelvic belt is not satisfactory a double shoulder belt will be used in preference to a three-point belt. However, this double shoulder belt has the disadvantage that it prevents the child from effecting the movements necessary for his well being.

SUMMARY OF THE INVENTION

The object of the present invention is to produce a safety belt which, in large measure, can be relied on to remain in the correct position and which restricts the child's freedom of movement as little as possible.

The solution according to the invention consists in using a three-point belt of the type described initially which is characterized in that the shoulder belt and the other part of the pelvic belt are joined by means of a back belt the connection point of which with the shoulder belt is adjustable. The adjustment feature enables the belt to be adapted to different body sizes. To permit the shoulder belt to fulfill its function it should extend tangentially from the fastening point onto the shoulder or chest. Accordingly, the fastening point should be disposed sufficiently low down before or on the shoulder so as not to deflect the shoulder belt from the desired position.

In many cases, an adjustable connection between the back belt and the shoulder belt will be satisfactory. However, it is preferable for the back belt and the shoulder belt to be rigidly connected together. The function of the back belt is not simply to keep the shoulder belt in the desired position but also to provide support for the person to be strapped in against forces which tend to throw him against the lateral parts of the vehicle body. This feature is especially important for children as the center of gravity in children is substantially higher than in adults and they are not naturally capable of resisting such forces.

To provide some degree of adjustability even when the shoulder belt is rigidly connected to the back belt, the belt section forming the shoulder belt may be adjustable both at its lower and upper fastening points. This can be achieved in an especially simple manner by providing an automatic-blocking spring-loaded winder at one of the two fastening points. An adjustment device need then only be provided at the other fastening point.

An important advantage of the embodiment comprising an automatic winder is that the child has considerable freedom of movement in the upper part of his body, at least in the direction of the inner part of the vehicle (away from the side wall of the vehicle). The child can even lie down in the afore-mentioned direction. However, a movement in the opposite direction is prevented by the above-described protective action of the belt which consists of the back and shoulder belt sections and which is anchored in place at its lower inner side.

Other objects, features and advantages of the present invention will be made apparent in the course of the following detailed description of a preferred embodiment thereof which is provided with reference to the accompanying drawings.

BRIEF DESCRIPTION OF THE DRAWINGS

FIGS. 1, 2 and 3 respectively represent a front view, a plan view and a side view of the belt arrangement, and FIG. 4 is a front view showing the body of the person lying sideways.

DESCRIPTION OF THE PREFERRED EMBODIMENT

In all the figures, 1 designates the trunk of the body to be strapped in place. The body comprises the shoulders and arm joints 2 and the leg joints 3. It should be assumed that the person is sitting on the righthand side (in the direction of travel) of the rear seat of a private automobile. The broken line 4 represents the upper edge of the backrest and 5 designates the right side of the car. Above and behind the seat on the right of the person is an automatic belt winder 6 mounted, for example, on the rear window ledge behind the backrest. The lower fastening points 7 and 8 are located in the normal position, laterally behind and a short distance beneath the seat.

The shoulder belt 9 and the one part 10 of the pelvic belt consist of a continuous belt section which is deflected at the lock fastening 11. The part 10 of the pelvic belt is adjustable at the fastening point 7, as represented diagrammatically by a loose belt end 12.

The other end 13 of the pelvic belt extends from the lock fastening 11 to the fastening point 8.

The back belt 14 connects the shoulder belt 9 with the pelvic belt section 13. The belt sections are, for example, sewn together at 15 and 16. By virtue of the adjustment feature at fastening point 7, the connection point 15 is adjustable in such a way that it is disposed slightly in front of the shoulder and is not tensioned in the normal position but is also not loose. The lower part of the shoulder belt 9 and the back belt 14 together with the part 13 of the pelvic belt form a loop which is anchored at fastening point 8. This loop both prevents the shoulder belt 9 from slipping off the shoulder over which it is passed and it also prevents the body 1 from being tilted, to any considerable degree, in the direction of the arrow 17 (FIG. 1). Accordingly, this loop helps prevent the body from striking against the vehicle wall 5.

However, as illustrated in FIG. 4, the body can be tilted sideways in the other direction. Thus, the child can lie down and sleep on the back seat without the safety belt constituting a hindrance. In the course thereof, the loop remains in position over the shoulder and thus keeps the shoulder belt 9 in position on the shoulder.

Thus, the back belt not only keeps the shoulder belt in the desired position when the body is in the sitting position but also when it is in the lying position. Although the back belt does not fulfill any substantial function in regard to the deceleration of the body when it is cast forwards during an accident, it does help to secure the lying body. During a forward movement, the loop formed by the back belt, the lower part of the shoulder belt and the part 13 of the pelvic belt, is stressed and thus supports the upper part of the body. The upper part of the shoulder belt 9 is simultaneously tensioned and it pulls the upper part of the body slightly upwards. In such a case the upper part of the body is obviously not supported as well as if it had been in the sitting position, but the body support is not limited to the action of the pelvic belt as would have been the case if the body had slipped out of the shoulder belt in the lying position and the afore-mentioned loop had not been present.

The belt is primarily suitable for children between the age of 5 and 10 years. The adjustment range can be adequately adapted to cater for the size variations occurring in this age group. By virtue of the additional inherent securing functions provided by the back belt, this safety belt can also be used advantageously for adults.

Instead of being attached to the pelvic belt section, the back belt could also be secured to the fastening point associated with this pelvic belt section. However, it is normally preferable to attach the back belt to the pelvic belt.

The part 10 of the pelvic belt obviously does not have to be adjustable precisely at the fastening point 7. The expression "at the attachment point 7" simply means that the pelvic belt should be adjustable in the region between the lock fastening and its fastening point.

What is claimed is:

1. In a motor vehicle passenger safety belt with a three-point connection to the motor vehicle comprising a pelvic belt with two end parts connected to the motor vehicle for extension from opposite sides of a passenger and having fastening means for fastening the end parts together for fastening the pelvic belt across the passenger and a shoulder belt connected to the motor vehicle and to one end part of the pelvic belt extending from one side of the passenger and so as to cross in front of the passenger downwardly over a shoulder on said one side toward the other side of the passenger when the end parts of the pelvic belt are fastened together, the improvement wherein the safety belt further comprises a back belt connected at one end to the shoulder belt at the shoulder of the passenger and at its opposite end to the other end part of the pelvic belt so as to extend over at least a portion of said shoulder and cross in back of the passenger toward said other side of the passenger for firmly securing the upper body of the passenger between said shoulder and back belts while permitting full lateral upper body movement toward said other side without shoulder strap release from the passenger.

2. A safety belt as claimed in claim 1 wherein the back belt is adjustably connected to the shoulder belt.

3. A safety belt as claimed in claim 1 wherein the back belt is rigidly connected to the shoulder belt and the shoulder belt is adjustable at both its lower connecting point to the pelvic belt and at its upper connecting point to the motor vehicle.

4. A safety belt as claimed in claim 3 further comprising an automatic locking spring-loaded winder at one of the two connecting points of the shoulder belt.

5. In a motor vehicle passenger safety belt with a three-point connection to the motor vehicle comprising a pelvic belt with two end parts connected to the motor vehicle for extension from opposite sides of a passenger and having fastening means for fastening the end parts together for fastening the pelvic belt across the passenger and a shoulder belt connected to the motor vehicle and to the pelvic belt and so as to cross in front of the passenger downwardly over one shoulder toward the other side of the passenger, the improvement wherein the safety belt further comprises a back belt connected at one end to the shoulder belt at the shoulder of the passenger and at the opposite end to the end part of the pelvic belt extending from said other side of the passenger and so as to extend over at least a portion of said shoulder and cross in back of the passenger toward said other side of the passenger for firmly securing the upper body of the passenger between said shoulder and back belts while permitting full lateral upper body movement toward said other side without shoulder strap release from the passenger.

6. A safety belt as claimed in claim 1 wherein the back belt is rigidly connected to the shoulder belt, said shoulder belt and said one end part of said pelvic belt being one continuous member adjustably connected to the motor vehicle at least one end of said continuous member.

* * * * *